United States Patent
Dalton et al.

(10) Patent No.: US 12,546,015 B2
(45) Date of Patent: Feb. 10, 2026

(54) FLUORIDE ION CLEANING SYSTEMS AND METHODS INCLUDING POST-RETORT FLUID STREAM PROCESSING

(71) Applicant: General Electric Company, Schenectady, NY (US)

(72) Inventors: James C. Dalton, Pickens, SC (US); Jonathan Lomas, Simpsonville, SC (US)

(73) Assignee: GE INFRASTRUCTURE TECHNOLOGY LLC, Greenville, SC (US)

( * ) Notice: Subject to any disclaimer, the term of this patent is extended or adjusted under 35 U.S.C. 154(b) by 268 days.

(21) Appl. No.: 18/307,120

(22) Filed: Apr. 26, 2023

(65) Prior Publication Data

US 2024/0360564 A1   Oct. 31, 2024

(51) Int. Cl.
*F01D 25/00*   (2006.01)
*C23G 5/00*   (2006.01)
*B01D 45/02*   (2006.01)

(52) U.S. Cl.
CPC ............ *C23G 5/00* (2013.01); *F01D 25/002* (2013.01); *B01D 45/02* (2013.01)

(58) Field of Classification Search
CPC .. C23G 5/00; B01D 45/02; B01D 2257/2047; B01D 53/68; B01D 53/78; B01D 45/12;

(Continued)

(56) References Cited

U.S. PATENT DOCUMENTS 5,955,037 A * 9/1999 Holst .................... B01D 53/14
406/48
6,536,135 B2   3/2003 Lipkin et al.
(Continued)

FOREIGN PATENT DOCUMENTS

CA   2958128 C   4/2021
EP   0783044 B1   3/2004
(Continued)

OTHER PUBLICATIONS

Extended European Search Report received for EP24168463.8 on Jan. 23, 2025; 12 pps.
(Continued)

*Primary Examiner* — Erin F Bergner
(74) *Attorney, Agent, or Firm* — Armstrong Teasdale LLP

(57) ABSTRACT

A fluoride ion cleaning system includes a retort for cleaning at least one component via a working fluid supplied to the retort, a post-retort subsystem for processing a post-retort fluid stream exiting the retort at a first temperature, and a scrubber downstream from the post-retort subsystem. The post-retort subsystem includes a separator in flow communication with the retort. The separator includes an inlet for receiving the post-retort fluid stream from the retort and an outlet for the post-retort fluid stream exiting the separator. The post-retort subsystem also includes a cooling device for selectively cooling the post-retort fluid stream to a second temperature, the second temperature being lower than the first temperature. The second temperature enables particulate to be separated from the post-retort fluid stream within the separator.

16 Claims, 7 Drawing Sheets

(58) Field of Classification Search
CPC .... B01D 47/02; B01D 53/79; B01D 2251/50; C01B 7/191; C01B 7/195; C01F 11/22; F01D 25/00; F01D 25/002; F01D 25/12; B08B 3/10; B08B 11/00; F05D 2220/32
See application file for complete search history.

(56) References Cited

U.S. PATENT DOCUMENTS

| | | |
|---|---|---|
| 7,125,457 B2 | 10/2006 | Kool et al. |
| 11,235,405 B2 | 2/2022 | Henderson et al. |
| 2006/0065120 A1 | 3/2006 | Clements et al. |
| 2010/0126349 A1* | 5/2010 | Vermeulen ............ B01D 47/05 96/243 |
| 2018/0030576 A1 | 2/2018 | Urza |
| 2019/0351369 A1* | 11/2019 | Catalano ............... B01D 53/18 |
| 2022/0363540 A1 | 11/2022 | Luna et al. |
| 2023/0034561 A1 | 2/2023 | Hsu et al. |

FOREIGN PATENT DOCUMENTS

| | | |
|---|---|---|
| EP | 2191930 A2 | 6/2010 |
| EP | 2751306 B1 | 10/2019 |
| EP | 3219380 B1 | 10/2020 |
| EP | 3219434 B1 | 3/2023 |
| JP | 5080002 B2 | 11/2012 |
| JP | 5705547 B2 | 4/2015 |
| KR | 102511839 B1 | 3/2023 |
| KR | 102566105 B1 | 8/2023 |
| MY | 156250 A | 1/2016 |
| SG | 161817 A1 | 6/2010 |
| SG | 181385 A1 | 6/2012 |

OTHER PUBLICATIONS

European Search Report received for EP 24168463.8 on Nov. 4, 2024; 13 pps.
European Examination Report, Application No. 24168463.8, dated Oct. 2, 2025, 8 pages.

* cited by examiner

FLUORIDE ION CLEANING SYSTEMS AND METHODS INCLUDING POST-RETORT FLUID STREAM PROCESSING

BACKGROUND

The present disclosure relates generally to repair operations on gas turbine components and, more specifically, to subsystems and methods for processing of a post-retort fluid stream in fluoride ion cleaning processes.

Aeronautical and power generation turbine components, such as blades, shrouds, and vanes, are often fabricated from superalloy materials, including, but not limited to including, nickel-, cobalt-, and iron-nickel-based superalloy materials. During service, turbine components are exposed to high pressure and high temperature environments and as a result, complex, chemically stable, thermal oxides may form on the components. Such oxides may include, but are not limited to only including, oxides of aluminum, titanium, chromium, and combinations thereof. Turbines are periodically overhauled to prolong the service life or enhance performance of the turbine. During these overhauls, the turbine components may be subjected to various repair operations, including welding or brazing. The presence of chemically stable thermal oxides on the components reduces the ability of a superalloy to be welded or brazed. Therefore, removal of these oxides by cleaning the turbine components prior to repair is often essential for successful completion of the overhaul.

High-temperature, reactive-atmosphere batch-cleaning processes are known for use in removing chemically-stable oxides from turbine components. The processes that generally rely on the high reactivity of fluoride ions for cleaning are collectively known as "fluoride ion cleaning" (FIC) processes. Known embodiments of FIC processes include single volume chambers (also referred to as "cleaning retorts" or "retorts"), or retorts with distribution manifolds that are designed to provide uniform heating and working fluid distribution and exchange. At least some known FIC processes, such as a dynamic FIC cleaning process, enable working fluids, such as hydrogen fluoride, to flow during operation. Other known FIC processes, such as pulsed FIC processes alternate pressure and flow conditions to facilitate improving the effectiveness of the cleaning cycles. In addition, at least some known FIC processes operate with an increased flow rate of hydrogen fluoride to facilitate cleaning more tenacious oxides. During an FIC process, hydrogen fluoride acts on a component in the retort and reacts with the metal oxides to form metal fluorides. The metal fluorides are subsequently dissolved or entrained in a fluid stream that includes excess hydrogen fluoride, a carrier gas (e.g., $H_2$) and/or a reaction byproduct (e.g., $H_2O$), enabling the removal of the metal fluorides in the fluid stream exiting the cleaning retort. In addition to the removal of oxides, hydrogen fluoride may also react with surface metals to form metal fluorides, thus enabling the removal of potential oxide reformers. The FIC process leaves behind a clean surface of the component, which may then be subjected to brazing and/or other repair processes.

Typically, an excess of hydrogen fluoride is used in the FIC process, and the fluid stream that is channeled from the cleaning retort (also referred to herein as a "post-retort fluid stream") contains hydrogen fluoride as well as the metal fluorides being removed from the component. Hydrogen fluoride and other reaction byproducts in the post-retort fluid stream must be removed to ensure that exhaust from the retort is safe for release from the system. To this end, known FIC processes often channel the post-retort fluid stream from the retort through a scrubber and its necessary ancillary equipment (e.g., control valves, sensors, pumps, and other equipment) to clean the post-retort fluid stream and to capture hydrogen fluoride and other reaction byproducts from the post-retort fluid stream. This equipment is relatively expensive and complicated, and must be operated at temperatures well below the retort working temperatures. However, because the post-retort fluid stream after a cleaning cycle is significantly hotter than the operational temperature of the scrubber subsystem equipment, the post-retort fluid stream may require cooling before it enters the scrubber subsystem.

During cooling, metal fluorides that are dissolved in the post-retort fluid stream at high temperature precipitate out of solution as the temperature decreases. The temperature of the post-retort fluid stream is higher than the saturation point of the solution, but the solution may become saturated or supersaturated as the post-retort fluid stream is cooled and channeled towards the scrubber subsystem equipment. Metal fluorides that precipitate out of the solution deposit in the post-retort piping and scrubber subsystem equipment. The deposits may create substantial fouling in, and adversely impact the performance of, the post-retort piping and scrubber subsystem equipment (e.g., pumps, valves, sealing surfaces, and instrumentation) in as few as one operational cycle.

Accordingly, there exists a need for reducing or eliminating fouling in post-retort equipment in FIC systems.

BRIEF DESCRIPTION

One aspect is a fluoride ion cleaning system that includes a retort for cleaning at least one component via a working fluid supplied to the retort, a post-retort subsystem for processing a post-retort fluid stream exiting the retort at a first temperature, and a scrubber. The post-retort subsystem includes a separator in flow communication with the retort and a cooling device. The separator includes an inlet for receiving the post-retort fluid stream from the retort and an outlet for the post-retort fluid stream exiting the separator. The post-retort subsystem also includes a cooling device for selectively cooling the post-retort fluid stream to a second temperature, the second temperature being lower than the first temperature, where the second temperature enables particulate to be separated from the post-retort fluid stream within the separator. The scrubber is downstream from the post-retort subsystem for receiving the post-retort fluid stream discharged from the separator.

Another aspect is a fluoride ion cleaning system that includes a retort for cleaning at least one component via a working fluid supplied to the retort, and a post-retort subsystem for processing a post-retort fluid stream exiting the retort at a first temperature. The post-retort subsystem includes a separator in flow communication with the retort. The separator includes an inlet for receiving the post-retort fluid stream from the retort and an outlet for the post-retort fluid stream exiting the separator. The post-retort subsystem also includes a cooling device for selectively cooling the post-retort fluid stream to a second temperature, the second temperature being lower than the first temperature, where the second temperature enables particulate to be separated from the post-retort fluid stream within the separator. The fluoride ion cleaning system further includes a controller coupled in communication with the cooling device. The controller is configured to control the cooling device based on a first setpoint corresponding to the second temperature and at least one operating parameter of the fluoride ion cleaning system.

Another aspect is a method of operating a fluoride ion cleaning system. The method includes supplying a working fluid to a retort for cleaning at least one component; channeling a post-retort fluid stream from the retort to a separator, wherein the post-retort fluid stream exits the retort at a first temperature; cooling the post-retort fluid stream to a second temperature that is lower than the first temperature; separating particulate from the post-retort fluid stream at the second temperature within the separator; and channeling the post-retort fluid stream from the separator towards a scrubber.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein.

Figure 1:
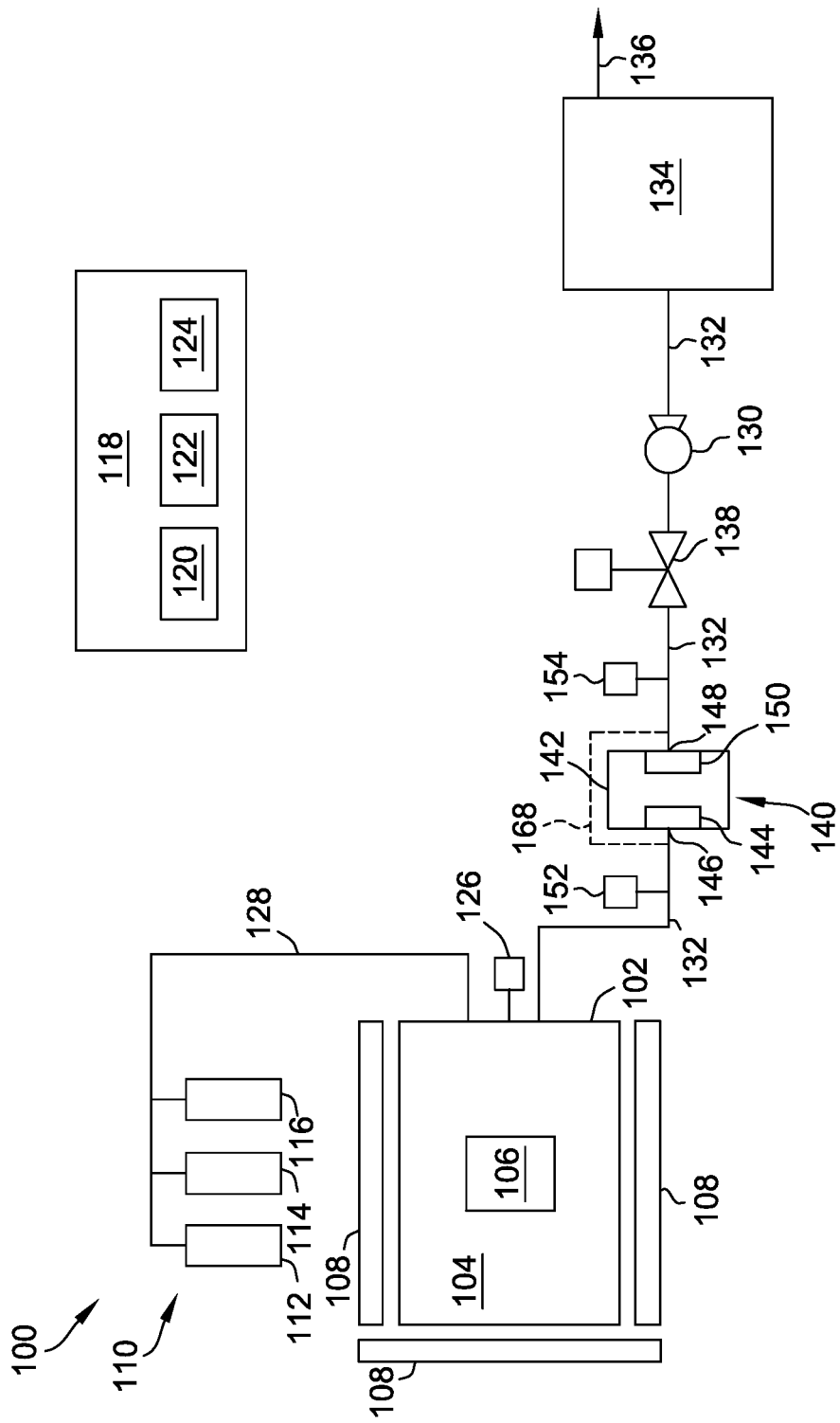
FIG. 1 is a schematic illustration of an exemplary fluoride ion cleaning system.

Unless otherwise indicated, the drawings provided herein are meant to illustrate features of embodiments of the disclosure. These features are believed to be applicable in a wide variety of systems comprising one or more embodiments of the disclosure. As such, the drawings are not meant to include all conventional features known by those of ordinary skill in the art to be required for the practice of the embodiments disclosed herein. Like features between the drawings are indicated using like reference numerals.

DETAILED DESCRIPTION

The exemplary embodiments described herein relate to exemplary fluoride ion cleaning systems and methods that include processing a fluid stream being channeled from a cleaning retort (also referred to herein as a "post-retort fluid stream") using a post-retort subsystem that separates particulate from the post-retort fluid stream to facilitate reducing or eliminating fouling in downstream handling equipment (e.g., piping, sensors, pumps, valves, scrubbers). The particulate are separated from the post-retort fluid stream via a post-retort subsystem that cools the post-retort fluid stream to a temperature at which a suitable fraction of particulate dissolved in the post-retort fluid stream precipitate out of solution. The particulate (e.g., metal fluorides) are separated from the cooled post-retort fluid stream within a separator. The separator may separate the particulate from the post-retort fluid stream via velocity-driven separation (e.g., a cyclone separator) or by gravity-driven separation (e.g., a low-velocity cold trap), for example. The post-retort subsystem includes a cooling device that cools the post-retort fluid stream between the retort and the separator (e.g., an inline heat exchanger) and/or a cooling device that cools the post-retort fluid stream within the separator (e.g., via cooling tubes or a cooling jacket circumscribing the separator). Suitably, the post-retort subsystem operates without filtration media, as the working fluids (e.g., hydrogen fluoride) used in the exemplary fluoride ion cleaning processes create tenacious environments that would readily degrade filtration media.

In exemplary embodiments, the processed post-retort fluid stream is channeled from the post-retort subsystem towards a scrubber. The scrubber operates to clean the post-retort fluid stream and to remove excess working fluid (e.g., hydrogen fluoride) and other gaseous byproducts from the post-retort fluid stream. In this regard, the separator and the cooling device may be independently controlled such that processing the post-retort fluid stream at the post-retort subsystem stage is substantially limited to removing solid particulate from the post-retort fluid stream. Various ancillary equipment (e.g., control valves, pumps, piping) may be coupled between the post-retort subsystem and the scrubber. The post-retort subsystem operates to facilitate reducing and/or eliminating fouling that otherwise occurs in the downstream ancillary equipment, thereby increasing the operational lifetime of this equipment, reducing maintenance and downtime costs associated with cleaning and/or replacing fouled equipment, and providing flexibility in the equipment that may be used (e.g., by enabling lower cost materials for the equipment).

In some embodiments, the post-retort subsystem includes a heating device that re-heats the post-retort fluid stream to a suitable temperature that is higher than the temperature at which precipitate is separated from the post-retort fluid stream. The post-retort fluid stream may be re-heated to a temperature within an operational temperature range that is defined by the requirements of the ancillary equipment (e.g., a vacuum pump) and/or the scrubber. Additionally and/or alternatively, the post-retort fluid stream may be re-heated to a temperature higher than the saturation point of the post-retort fluid stream to facilitate reducing or eliminating the propensity of any particulate that remain dissolved in the post-retort fluid stream after the post-retort subsystem to deposit on the downstream ancillary equipment. The heating device may be a heating jacket and/or heating coils circumscribing an outlet of the separator, and/or an inline heat exchanger coupled about or in proximity to the outlet of the separator, for example.

In some embodiments, the cooling device and/or the heating device may be coupled in communication with a controller. The controller selectively controls the cooling device to cool the post-retort fluid stream to a suitable temperature for separating precipitate within the separator and/or controls the heating device to heat the post-retort fluid stream exiting the separator to a suitable temperature. The controller may control the cooling device and/or the heating device based on a respective temperature setpoint. In addition, the controller may control the cooling device and/or the heating device based on one or more operating parameters associated with the fluoride ion cleaning process and/or system. For example, the controller may utilize operating parameters associated with conditions of the post-retort fluid stream (e.g., a flow rate, temperature, and/or pressure) upstream from the cooling device and/or associated with a control scheme of the fluoride ion cleaning process and/or system to control the cooling device to respond to dynamic process and system conditions and cool the post-retort fluid stream to a suitable temperature for separating precipitate within the separator. The controller may also utilize operating parameters associated with the fluoride ion cleaning process and/or system to control the heating device to respond to dynamic process and system conditions and re-heat the post-retort fluid stream to a suitable re-heat temperature after the post-retort subsystem stage. Additionally and/or alternatively, the controller may use feedback, for example, from a temperature sensor downstream from the separator to control the heating device to a suitable re-heat temperature setpoint. Suitably, the re-heat temperature, as controlled by the controller, may be maintained above a minimum temperature and below a maximum critical temperature (i.e., within an operational temperature range) that are each defined by the requirements of the ancillary equipment and/or the scrubber.

The exemplary embodiments disclosed herein facilitate separating particulate from a post-retort fluid stream to facilitate reducing or eliminating fouling in downstream piping and equipment. Thereby, the operational lifetime of the downstream piping and equipment is facilitated to be increased, while maintenance and downtime costs associated with disassembly and cleaning of fouled piping and equipment are facilitated to be substantially reduced or eliminated. Additionally, separating particulate from the post-retort fluid stream enables the use of lower cost materials used in downstream equipment for handling the post-retort fluid stream being channeled to a scrubber, as the equipment is at substantially lower risk of fouling and degradation. Moreover, the operating conditions of the post-retort fluid stream may be controlled using cooling and/or heating devices included in the post-retort subsystem and a controller that may control the cooling and/or heating devices. The controller may monitor dynamic conditions within the fluoride ion cleaning process and/or system (e.g., changes in the amount of working fluid being supplied to the cleaning retort and/or the temperature conditions within the retort) and control the cooling and/or heating devices to respond to the dynamic process and system conditions to ensure that suitable cooling and/or heating of the post-retort fluid stream are being provided. As such, the exemplary embodiments disclosed herein overcome several disadvantages associated with known fluoride ion cleaning processes.

A fluoride ion cleaning (FIC) process, as disclosed herein, may include a hydrogen-enhanced, mixed-gas FIC process (hereinafter referred to as "H-FIC"), which removes oxides from surfaces and cracks of articles. The H-FIC process includes supplying hydrogen fluoride (HF) in a hydrogen ($H_2$) carrier gas to a cleaning retort for acting on a metal article that includes thermally stable oxides formed thereon. The H-FIC process can be used to clean metal articles, such as but not limited to superalloy aeronautical and power generation turbine vanes, shrouds, blades, and like elements (hereinafter "turbine components").

Unless otherwise indicated, approximating language, such as "generally," "substantially," and "about," as used herein indicates that the term so modified may apply to only an approximate degree, as would be recognized by one of ordinary skill in the art, rather than to an absolute or perfect degree. Accordingly, a value modified by a term or terms such as "about," "approximately," and "substantially" is not to be limited to the precise value specified. In at least some instances, the approximating language may correspond to the precision of an instrument for measuring the value. Additionally, unless otherwise indicated, the terms "first," "second," etc. are used herein merely as labels, and are not intended to impose ordinal, positional, or hierarchical requirements on the items to which these terms refer. Moreover, reference to, for example, a "second" item does not require or preclude the existence of, for example, a "first" or lower-numbered item or a "third" or higher-numbered item.

The singular forms "a," "an," and "the" include plural references unless the context clearly dictates otherwise. "Optional" or "optionally" means that the subsequently described event or circumstance may or may not occur, and that the description includes instances where the event occurs and instances where it does not. Furthermore, references to "one embodiment" are not intended to be interpreted as excluding the existence of additional embodiments that also incorporate the recited features. Moreover, unless explicitly stated to the contrary, embodiments "including" or "having" an element or a plurality of elements having a particular property may include additional such elements not having that property.

FIG. 1 is a schematic illustration of an exemplary FIC system 100, such as a H-FIC system. However, other H-FIC system constructions are within the scope of the disclosure. FIC system 100 includes a retort 102 (also known as a "reaction chamber") having an interior 104 sized to receive at least one component 106 therein. The retort 102 is formed from materials that are compatible with the FIC cleaning atmosphere. For example, the retort 102 may be formed from, but is not limited to being formed from, nickel-, iron-, or cobalt-based alloys.

The component 106 may suitably be a turbine component 106 formed from superalloy materials, including, but not limited to including, nickel-, cobalt-, and iron-nickel-based superalloy materials. The turbine component 106 may include complex, chemically stable, thermal oxides formed on at least a portion of a surface thereof and/or within cracks formed in the component 106. The thermal oxides may include, but are not limited to including, oxides of aluminum (e.g., $Al_2O_3$), titanium (e.g., $TiO_2$), chromium (e.g., $Cr_2O_3$), and combinations thereof. The thermal oxides may be formed during service of the turbine component 106, for example, due to exposure of the component 106 to high pressure and high temperature environments.

The FIC system 100 also includes heaters 108 adjacent to the retort 102 and a gas distribution system 110 for supplying process gases to the retort 102. The heaters 108 may include electrical heaters, for example. The heaters 108 are operable to heat the interior 104 of the retort 102 to temperatures suitable to create a reactive atmosphere within the interior 104. The reactive, high temperature atmosphere enables a working fluid included in the processes gases supplied by the gas distribution system 110 to act on the turbine component 106 (e.g., temperatures higher than about 1050° C.). The gas distribution system 110 includes a source 112 of inert gas (e.g., argon, Ar), a source 114 of a carrier gas (e.g., hydrogen, $H_2$, and/or nitrogen, $N_2$), and a source 116 of a working fluid. The working fluid is suitably liquid or gaseous hydrogen fluoride or a precursor for hydrogen fluoride. For example, the working fluid may be a gaseous or liquid fluorine-containing precursor (e.g., tetrafluoroethane) that reacts in-situ with $H_2$ at sufficient temperatures within the retort 102 to form hydrogen fluoride.

The FIC system 100 also includes a controller 118 coupled in communication with the retort 102, the heaters 108, and the gas distribution system 110. The controller 118 controls conditions of the interior 104 of the retort 102 during an FIC process. For example, the controller 118 may control the heaters 108 to heat the interior 104 to suitable temperatures during an FIC process. The controller 118 may control the gas distribution system 110 to meter the supply of the inert gas from the source 112, the carrier gas from the source 114, and the working fluid from the source 116 at suitable flow rates depending, for example, on the stage of the FIC process and the temperature within the interior 104 of the retort 102. The controller 118 may be coupled in communication with one or more sensors 126 that monitor operating parameters within the interior 104 of the retort 102 and/or upstream from the retort 102 (e.g., along a process gas supply line 128). For example, the one or more sensors 126 may include temperature sensors, pressure sensors, flow sensors, or any other sensor that measures operating parameters of the FIC process and/or the FIC system 100. The controller 118 may receive measurements from the one or more sensors 126 and make determinations and/or execute control actions based on the monitored operating parameters of the FIC process.

The controller 118 may be any suitable computing device or computer system and includes one or more processors 120 and a memory area 122. The processor 120 executes instructions stored in the memory area 122. The term "processor", as used herein, refers to central processing units, microprocessors, microcontrollers, reduced instruction set circuits (RISC), application specific integrated circuits (ASIC), a programmable logic controller (PLC), logic circuits, and any other circuit or processor capable of executing the functions described herein. The above are examples, and are not intended to limit in any way the definition and/or meaning of the term "processor." In addition, one or more processors 120 may be in one computing device or a plurality of computing devices acting in parallel.

Stored in the memory area 122 are, for example, processor-executable instructions for receiving and processing input and controlling FIC operating parameters of the FIC system 100 based on the processed input. The memory area 122 may include, but is not limited to including, any computer-operated hardware suitable for storing and/or retrieving processor-executable instructions and/or data. The memory area 122 may include random access memory (RAM) such as dynamic RAM (DRAM) or static RAM (SRAM), read-only memory (ROM), erasable programmable read-only memory (EPROM), electrically erasable programmable read-only memory (EEPROM), and nonvolatile RAM (NVRAM). Further, the memory area 122 may include multiple storage units such as hard disks or solid-state disks in a redundant array of inexpensive disks (RAID) configuration. The memory area 122 may include a storage area network (SAN) and/or a network attached storage (NAS) system. In some embodiments, the memory area 122 includes memory that is integrated in the controller 118. For example, the controller 118 may include one or more hard disk drives as the memory area 122. The memory area 122 may also include memory that is external to the controller 118 and may be accessed by a plurality of computing devices. The above memory types are for example only and are thus, not limiting as to the types of memory usable for storage of processor-executable instructions and/or data.

The controller 118 also includes a user input device 124 or user interface 124 for receiving input from an operator. The information may be one or more selected operating parameters for an FIC process. The input device 124 may include, for example, a keyboard, a pointing device, a mouse, a stylus, a touch sensitive panel (e.g., a touch pad or a touch screen), or an audio input device. A single component such as a touch screen may function as both an output device of the controller 118 (e.g., a media output component) and the input device 124. The controller 118 may include additional input channels such as, for example, computer peripherals associated with the user interface 124 such as a mouse and a keyboard. Alternatively, other computer peripherals may also be used such as, but not limited to, a scanner or a touchscreen. Furthermore, in the embodiments described herein, output channels may include, but are not limited to including, an operator interface monitor.

The controller 118 may be coupled in communication with various components of the FIC system 100 via one or more communication interfaces (not shown). The communication interfaces may be coupled in communication with the processor 120 and may be coupled in communication with one or more other devices, such as, for example, the one or more sensors 126, the heaters 108, and/or the gas distribution system 110, and to perform input and output operations with respect to such devices while performing as an input channel. For example, an exemplary communication interface may include, without limitation, a wired network adapter, a wireless network adapter, a mobile telecommunications adapter, a serial communication adapter, or a parallel communication adapter. The communication interfaces may receive a data signal from or transmit a data signal to one or more remote devices. For example, in some embodiments, a communication interface of the controller 118 may transmit/receive a data signal to/from the one or more sensors 126, the heaters 108, and/or the gas distribution system 110.

During operation, the turbine component 106 (or multiple turbine components 106) is placed within the interior 104 of the retort 102. The interior 104 of the retort 102 is heated, via the heaters 108, to a suitable temperature for an FIC process. For example, the interior 104 is heated to temperatures higher than about 950° C., higher than about 1000° C., or higher than about 1050° C. At these temperatures, hydrogen fluoride supplied to the retort 102 via the source 116 reacts with the metal oxides (e.g., $Al_2O_3$, $TiO_2$, and $Cr_2O_3$) formed on the component 106 and converts the metal oxides into metal fluorides according to the following exemplary equations:

$$6\,HF + Al_2O_3 = 2\,AlF_3 + 3\,H_2O.$$

$$4\,HF + TiO_2 = TiF_4 + 2\,H_2O.$$

$$6\,HF + Cr_2O_3 = 3\,H_2O + 2\,CrF_2 + F_2.$$

As the interior 104 is heated to a suitable temperature, process gases are supplied to the retort 102 via the gas distribution system 110. The supply of the process gases is controlled depending, at least in part, on the temperature of the interior 104. For example, as the interior 104 is heated, inert gas is supplied from the source 112 until the interior 104 reaches a suitable temperature for the carrier gas supplied via the source 114. For example, where hydrogen ($H_2$) is supplied as the carrier gas, the interior 104 may need to reach temperatures well above the flash point of $H_2$ (e.g., higher than about 700° C., such as higher than about 750° C.) prior to supplying $H_2$ via the source 114. Finally, the working fluid (e.g., hydrogen fluoride or a fluorine-containing precursor) is supplied via the source 116 when the interior 104 has reached a suitable temperature to create a reactive atmosphere for the hydrogen fluoride to act on the metal oxides formed on the component 106. The pressure level within the interior 104 may be controlled by selectively supplying additional process gases to the retort 102 and/or by selectively drawing process gases from the interior 104 (e.g., by operating a vacuum pump 130 fluidly coupled with the retort 102 via a retort exhaust line 132). For example, an FIC process may be performed within the retort 102 at atmospheric pressure or the pressure level within the interior 104 may be controlled (e.g., via controller 118) to below atmospheric pressure during the FIC process.

The working fluid (e.g., hydrogen fluoride) supplied to the retort 102 acts on the turbine component 106 and metal fluorides are taken up by and dissolved within the process gases and reaction byproducts (e.g., $H_2O$) within the retort 102. During and/or after the FIC process, a post-retort fluid stream is drawn from the retort 102 via the vacuum pump 130 through the exhaust line 132. The post-retort fluid stream contains excess working fluid (e.g., hydrogen fluoride) and carrier gas ($H_2$), as well as metal fluorides formed by the working fluid acting on the turbine component 106 and other reaction byproducts (e.g., $H_2O$).

In some embodiments, an operational cycle of an FIC process may include variations in the operating conditions of the retort 102, such as, for example, the flow rates of the process gases supplied to the retort 102, temperature within the interior 104, pressure within the interior 104, among other operating conditions. The variations are determined and/or defined by a control scheme or "recipe" of a particular FIC process. The control scheme may include setpoints for the operating conditions such as, for example, the temperature and/or pressure within the retort 102 and the flow rates for the process gases (e.g., flow rates for hydrogen fluoride and/or $H_2$). The control scheme may be used by the controller 118 to ramp to and stabilize at these setpoints for a given period of time at desired gas concentrations. In addition, an operational cycle of an FIC process may include operating between different control modes, such as between a dynamic control and a dynamic pulse control mode, for example, in which a different sub-control regimen with different operating parameter setpoints is established. Stated more broadly, during a single operational cycle of an FIC process, numerous variations in temperature, pressure, and/or flow rates may be experienced within the retort 102.

Still referring to FIG. 1, the FIC system 100 includes the retort exhaust line 132 through which the post-retort fluid stream is drawn from the retort 102 during and/or after an operational cycle of an FIC cleaning process. The post-retort fluid stream is channeled through the exhaust line 132 from the retort 102 to a scrubber 134. The post-retort fluid stream is treated in the scrubber 134 to remove hydrogen fluoride and other reaction byproducts in the post-retort fluid stream. For example, the scrubber 134 may include a packed bed of a sacrificial, high melting temperature material that reacts with the excess working fluid (e.g., hydrogen fluoride) in the post-retort fluid stream to form stable, high melting point fluoride compounds and non-toxic byproducts. In some embodiments, the sacrificial material may include salts such as calcium oxide (CaO), calcium carbonate ($CaCO_3$), NaCl, and combinations thereof. For example, calcium salts such as CaO and/or $CaCO_3$ react with hydrogen fluoride working fluid in the post-retort fluid stream at elevated temperatures to form non-hazardous, $CaF_2$ wastes that are readily disposable at room temperature, as well as gaseous $H_2O$ and $CO_2$ byproducts which may be emitted with the remaining post-retort fluid stream through a scrubber exhaust outlet 136. Optionally, the post-retort fluid stream may be treated in the scrubber 134 to remove any metal fluorides remaining in the post-retort fluid stream. For example, metal elements that exist in the post-retort fluid stream as fluorides may be reduced to metal alloys by reacting the metal fluorides with pure sacrificial metals such as iron. In some embodiments, the FIC system 100 may include two or more scrubbers 134 that operate in parallel, and/or a primary scrubber 134 and a secondary scrubber 134 that operate in series.

The vacuum pump 130 is upstream from the scrubber 134 and is selectively operable to pulse or modulate the pressure level within the retort 102. The operation of the vacuum pump 130 may facilitate evaporating semi-volatile metal fluorides from the surface of the turbine component 106, thus enabling fresh working fluid (e.g., hydrogen fluoride) to act on the component 106 and to convert a greater quantity of metal oxides into metal fluorides. Suitably, the vacuum pump 130 is coupled in communication with the controller 118. The controller 118 may execute control actions to control operation of the vacuum pump 130 and, thereby, maintain the pressure within the retort 102. The vacuum pump 130 channels the post-retort fluid stream to the scrubber 134 and may be operated to control a flow of the post-retort fluid stream entering the scrubber 134. As described in more detail herein, the post-retort fluid stream experiences a substantial decrease in temperature within the exhaust line 132. As such, the post-retort fluid stream may contain moisture upon entering the vacuum pump 130. Suitably, the vacuum pump 130 is a liquid ring type vacuum pump that is operable to handle moisture within the post-retort fluid stream while providing vacuum along the exhaust line 132.

Flow of the post-retort fluid stream through the exhaust line 132 between the retort 102 and the scrubber 134 may additionally and/or alternatively be controlled via a control valve 138. The control valve 138 may also be coupled in communication with the controller 118 to enable the controller 118 to control flow of the post-retort fluid stream through the exhaust line 132. In the exemplary embodiment, the control valve 138 is upstream from the vacuum pump 130. The control valve 138 may alternatively be downstream from the vacuum pump 130, or an additional control valve 138 may be included downstream from the vacuum pump 130.

Figure 2:
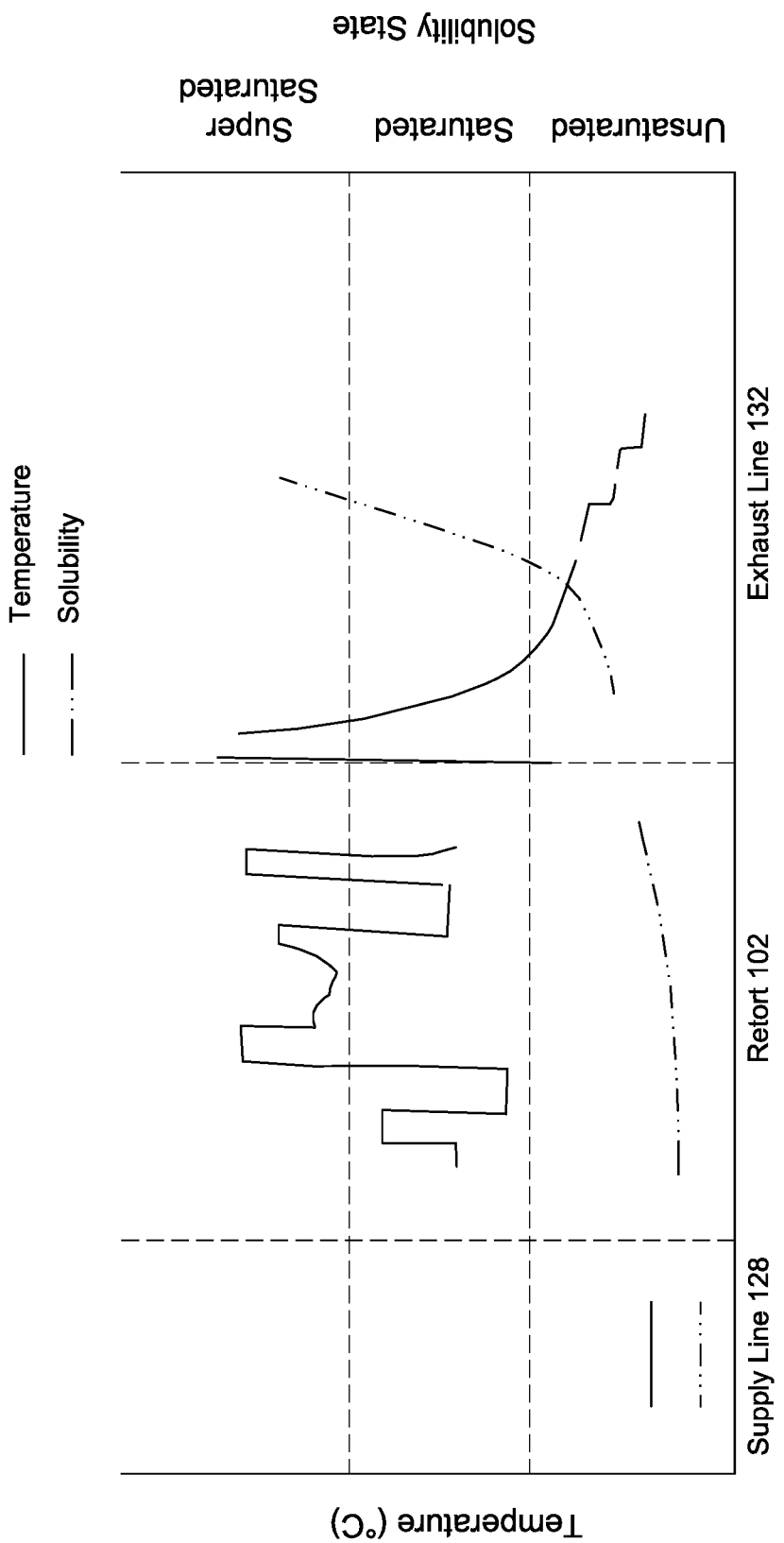
FIG. 2 is a conceptual diagram of known thermal and solubility states of process gases within a retort, and a post-retort fluid stream within a retort exhaust line in a fluoride ion cleaning system.

FIG. 2 illustrates a conceptual diagram of the thermal and solubility states of the process gases in the retort 102, and the post-retort fluid stream through the exhaust line 132 between the retort 102 and the scrubber 134, in a known FIC system. As shown in FIG. 2, the temperature of the process gases entering the retort 102 through the supply line 128 is relatively low. At this stage, there are no solids dissolved in the process gases as the process gases have not come into contact with the component 106 in the retort 102. In the retort 102, the temperature of the process gases increases rapidly as the interior 104 is maintained at a suitable temperature for the FIC process. For example, the process gases may be at a temperature of between about 950° C. to about 1100° C. in the retort 102. Also, as shown in FIG. 2, the temperature within the retort 102 varies throughout the FIC process according to the control scheme of the FIC process.

At this stage, the solubility of the process gases increases as the working fluid (e.g., hydrogen fluoride) acts on the component 106, converting metal oxides thereon into metal fluorides which are dissolved within the process gases. Because the process gases are at very high temperatures, the solubility state of the solution remains in an unsaturated state. After exiting the retort 102, the temperature of the post-retort fluid stream steadily decreases through the exhaust line 132 as the stream flows towards the scrubber 134. For example, the post-retort fluid stream may be at a temperature of between about 700° C. to about 950° C. when exiting the retort 102, and may decrease to a temperature of between about 200° C. to about 300° C., or a temperature lower than this range, as the post-retort fluid stream approaches the pump 130. The decrease in temperature of the post-retort fluid stream results in the solution become very saturated and potentially even super saturated. As a result, metal fluorides may precipitate out of the post-retort fluid stream and deposit, for example, in the exhaust line 132, the control valve 138, and/or the vacuum pump 130. The equipment may become significantly degraded by the deposited metal fluorides, and may require cleaning even after only a single operational cycle of the FIC process.

Referring again to FIG. 1, the FIC system 100 includes a post-retort subsystem 140 for use in processing the post-retort fluid stream exiting the retort 102. The post-retort subsystem 140 may be adjacent to an outlet of the retort 102, or may be downstream from the retort 102 and fluidly coupled to the outlet of the retort 102 via piping that defines the exhaust line 132. Suitably, the post-retort subsystem 140 is upstream from the scrubber 134 and the ancillary equipment (e.g., the control valve 138 and the pump 130). The post-retort subsystem 140 operates to separate particulate (e.g., metal fluorides) from the post-retort fluid stream to facilitate reducing or eliminating fouling in the downstream post-retort handling equipment (e.g., the exhaust line 132 downstream from the post-retort subsystem 140, the control valve 138, and/or the pump 130). Suitably, the post-retort subsystem 140 operates without filtration media, as the working fluid (e.g., hydrogen fluoride) in the post-retort fluid stream may create a tenacious environment that would readily degrade filtration media.

The post-retort subsystem 140 includes a separator 142 and a cooling device 144. The separator 142 includes an inlet 146 and an outlet 148. The post-retort fluid stream exiting the retort 102 is channeled into the separator through the inlet 146. The post-retort fluid stream exiting the retort 102 is at a relatively high temperature, also referred to herein as a first temperature of the post-retort fluid stream. For example, the first temperature of the post-retort fluid stream may be in a range of between about 700° C. to about 950° C., between about 700° C. to about 800° C., between about 750° C. to about 850° C., between about 800° C. to about 900° C., such as about 700° C., about 750° C., about 800° C., about 850° C., about 900° C., or about 950° C. The cooling device 144 operates to selectively cool the post-retort fluid stream prior to the stream entering the inlet 146 and/or within the separator 142. Suitably, the cooling device 144 selectively cools the post-retort fluid stream to a second temperature that is lower than the first temperature. The second temperature is suitably low enough to bring the post-retort fluid stream to a solubility state (e.g., saturated or super saturated) in which a substantial fraction of the particulate (e.g., metal fluorides) are capable of being separated from the post-retort fluid stream within the separator 142 (i.e., precipitates out of solution). For example, the solubility state of the post-retort fluid stream at the second temperature may cause greater than about 25% of the particulate to precipitate out of the post-retort fluid stream within the separator 142, such as in some embodiments greater than about 30%, greater than about 35%, greater than about 40%, greater than about 45%, greater than about 50%, greater than about 55%, greater than about 60%, greater than about 65%, greater than about 70%, greater than about 75%, greater than about 80%, greater than about 85%, or greater than about 90% of the particulate. In some embodiments, the solubility state of the post-retort fluid stream at the second temperature may cause between about 20% to about 99% of the particulate to precipitate out of the post-retort fluid stream within the separator 142. The second temperature may be, for example, less than 400° C., less than 350° C., less than 300° C., less than 250° C., less than 200° C., or less than 150° C. For example, the second temperature may be a temperature of between about 50° C. to about 450° C., between about 50° C. to about 300° C., between about 50° C. to about 200° C., between about 50° C. to about 100° C., between about 100° C. to about 400° C., between about 100° C. to about 300° C., between about 100° C. to about 200° C., between about 200° C. to about 450° C., between about 200° C. to about 300° C., or between about 300° C. to about 400° C.

Separation of the precipitate from the post-retort fluid stream within the separator 142 may be passive (i.e., facilitated substantially entirely by cooling the post-retort fluid stream to the second temperature) or the separator 142 may actively facilitate separation of the precipitate from the post-retort fluid stream at the second temperature. For example, in some embodiments, the separator 142 may include a sacrificial component (e.g., a pipe, a valve, or other inline equipment) upon which precipitated particulate (e.g., metal fluorides) are intentionally deposited during an operational cycle, thus enabling the separator 142 to be removed and/or cleaned, and/or replaced with another sacrificial component. In some embodiments, the separator 142 may actively facilitate separation, such as via gravitational and/or inertial forces. For example, the separator 142 may include a gravity separator (e.g., a low-velocity cold trap) that facilitates separating the particulate from the post-retort fluid stream at the second temperature via gravity-driven separation. The separator 142 may additionally and/or alternatively include a cyclone separator that facilitates separating the particulate from the post-retort fluid stream at the second temperature via velocity-driven separation. The post-retort subsystem 140 may include one or more than one separators 142. In some embodiments, the separator 142 may include two or more separators 142 that operate in parallel, and/or a primary separator 142 and a secondary separator 142 that operate in series.

The cooling device 144 may cool the post-retort fluid stream to the second temperature via direct or indirect cooling. For example, the cooling device 144 may include an inline heat exchanger coupled on the exhaust line 132 adjacent to, or upstream from, the inlet 146 for indirectly cooling the post-retort fluid stream entering into the separator 142. The cooling device 144 may additionally and/or alternatively include cooling coils spaced about the inlet 146 for indirectly cooling the post-retort fluid stream entering into the separator 142. The cooling device 144 may additionally and/or alternatively include a cooling jacket or cooling coils that circumscribe the separator 142 for indirectly cooling the post-retort fluid stream to the second temperature within the separator 142. For an indirect cooling device 144, a cooling fluid (e.g., chilled water) may be supplied to the cooling device 144 via a cooling fluid source (not shown) and heat is transferred between the post-retort fluid stream and the cooling fluid via the cooling device 144.

In some embodiments, the cooling device 144 may directly cool the post-retort fluid stream entering the separator 142 and/or within the separator 142 to the second temperature. For example, the cooling device 144 may inject a cooling fluid into the separator 142, such that the cooling fluid contacts the post-retort fluid stream within the separator 142 and cools the post-retort fluid stream to the second temperature. For a direct cooling device 144, the cooling fluid may suitably include process gases and/or reaction byproducts that are contained in the post-retort fluid stream such as, for example, the working fluid (e.g., HF), the inert gas (e.g., Ar), the carrier gas ($H_2$ and/or $N_2$), and/or water vapor. For example, a flow of carrier gas (e.g., $H_2$ and/or $N_2$) may be channeled from the source 114 to the direct cooling device 144 for injection into the separator 142. Suitably, the cooling fluid channeled to the direct cooling device 144 bypasses the retort 102. In a direct cooling operation, the cooling fluid may provide an additional advantage of further diluting particulate that remain dissolved within the post-retort fluid stream after the separation process at the post-retort subsystem 140.

The post-retort subsystem 140 may suitably re-heat the post-retort fluid stream exiting the separator 142 via the outlet 148 to a third temperature that is higher than the second temperature. The third temperature may be selected based on an operational temperature range that is defined by requirements of equipment downstream from the post-retort subsystem 140 (e.g., the pump 130 and/or the scrubber 134). Additionally and/or alternatively, the third temperature may be selected to be a temperature that is above the saturation point of the post-retort fluid stream to facilitate reducing or eliminating the propensity of any particulate that remain dissolved in the post-retort fluid stream after the post-retort subsystem 140 to deposit on the downstream equipment (e.g., the exhaust line 132 downstream from the post-retort subsystem 140, the control valve 138, and/or the pump 130). The third temperature may be any suitable temperature in a range between the first temperature and the second temperature. For example, the third temperature may be in a range of between about 50° C. to about 950° C., with the third temperature being a higher temperature than the second temperature and a lower temperature than the first temperature within that range. In some examples, the third temperature is near and slightly higher than the second temperature. For example, each of the second temperature and the third temperature may be within a range of between about 50° C. to about 450° C., with the third temperature being a higher temperature than the second temperature within that range. In some examples, the third temperature may be in a range of greater than about 450° C. and less than the first temperature (e.g., less than about 950° C., less than about 900° C., less than about 850° C., less than about 800° C., less than about 750° C., or less than about 700° C.).

To re-heat the post-retort fluid stream, the piping that defines the inlet 146 and the outlet 148 of the separator 142 may be in thermal communication to facilitate heat transfer between the post-retort fluid stream entering the separator 142 at the first temperature (i.e., before the cooling device 144) and the post-retort fluid stream exiting the separator 142 at the second temperature (i.e., after the cooling device 144). This configuration enables heat to transfer from the portion of the post-retort fluid stream at the higher first temperature to the portion of the post-retort fluid stream at the lower second temperature. This may provide the additional advantage of lowering the cooling capacity of the cooling device 144 that is required to cool the post-retort fluid stream to the second temperature.

Additionally and/or alternatively, the post-retort subsystem 140 may include a heating device 150 that operates to selectively re-heat the post-retort fluid stream exiting the separator 142 via the outlet 148 to the third temperature. The heating device 150 may be adjacent to the outlet 148, and/or downstream from, the outlet 148 and upstream from the control valve 138 and/or the pump 130. For example, the heating device 150 may include an inline heat exchanger coupled on the exhaust line 132 adjacent to, or downstream from, the outlet 148 for selectively heating the post-retort fluid stream exiting the separator 142 to the third temperature. The heating device 150 may additionally and/or alternatively include a heating jacket and/or heating coils spaced about the outlet 148 for selectively heating the post-retort fluid stream exiting the separator 142 to the third temperature. A heating fluid (e.g., hot water) may be supplied to the heating device 150 via a heating fluid source (not shown) such that heat is transferred between the post-retort fluid stream and the heating fluid via the heating device 150.

In some embodiments, the post-retort subsystem 140 may be downstream from the retort 102 for processing only a portion of the post-retort fluid stream exiting the retort 102. For example, post-retort subsystem 140 may process a first portion of the post-retort fluid stream and a second portion of the post-retort fluid stream may be selectively channeled around the post-retort subsystem 140. The exhaust line 132 may include a bypass line 168 for selectively channeling the second portion of the post-retort fluid stream to bypass the post-retort subsystem 140.

Still referring to FIG. 1, in the exemplary embodiment, the controller 118 is coupled in communication with the cooling device 144 and the heating device 150 for controlling the cooling and the re-heating of the post-retort fluid stream, respectively. The controller 118 may selectively control the cooling device 144 and the the heating device 150 based on setpoints corresponding to the second temperature and the third temperature of the post-retort fluid stream, respectively. For example, the controller 118 may control an amount of cooling fluid (e.g., chilled water in indirect cooling or a process gas or water vapor in direct cooling) supplied to the cooling device 144 to cool the post-retort fluid stream to the second temperature. The controller 118 may also control an amount of heating fluid (e.g., hot water) supplied to the heating device 150 to re-heat the post-retort fluid stream to the third temperature.

In some embodiments, the controller 118 may selectively control the cooling device 144 and/or the heating capacity of the heating device 150 using passive control. For example, the controller 118 may execute control actions to control an amount of cooling fluid supplied to the cooling device 144 and/or an amount of heating fluid supplied to the heating device 150 during an FIC process based on an invariant, established routine without utilizing in-process feedback to make control adjustments. The control action executed by the controller 118 to control the amount of cooling fluid supplied to the cooling device 144 and/or the amount of heating fluid supplied to the heating device 150 may be based substantially entirely on established temperature setpoints for an operational cycle of an FIC process and planned operating parameters of the FIC system 100 during the FIC process (e.g., the planned temperature within the retort 102, the planned flow rate of the process gases supplied to the retort 102, the planned temperature of the post-retort fluid stream upstream from the post-retort subsystem 140, and/or the planned flow rate of the post-retort fluid stream upstream from the post-retort subsystem 140). The passive control implemented by the controller 118 may include executing control actions based on planned variations in the operating parameters of the FIC system 100 (e.g., based on a planned control scheme of the FIC process being performed by the FIC system 100). For example, a planned control scheme of the FIC process may include variations in the temperature within the retort 102, the temperature of the post-retort fluid stream upstream from the post-retort subsystem 140, and/or the flow rate of the post-retort fluid stream upstream from the post-retort subsystem 140. These variations affect the cooling capacity of the cooling device 144 that is required to cool the post-retort fluid stream to the second temperature and/or the heating capacity of the heating device 150 that is required to re-heat the post-retort fluid stream to the third temperature. The controller 118 may execute control actions to accommodate these variations, for example, by increasing an amount of cooling fluid supplied to the cooling device 144 and/or an amount of heating fluid supplied to the heating device 150 where more cooling and/or heating is required, and/or decreasing an amount of cooling fluid supplied to the cooling device 144 and/or an amount of heating fluid supplied to the heating device 150 where less cooling and/or heating is required.

In some embodiments, the controller 118 may continuously or periodically monitor operating parameters of the FIC process and/or the FIC system 100 and execute control actions based on the monitored operating parameters to control the cooling device 144 and/or the heating device 150 to respond to dynamic process and system conditions. For example, as described above, the controller 118 may be coupled in communication with the one or more sensors 126 that monitor operating parameters (e.g., temperature, pressure, and/or flow rates) within the interior 104 of the retort 102 and/or upstream from the retort 102 (e.g., along a process gas supply line 128). The controller 118 may additionally and/or alternatively be coupled in communication with sensors 152 and 154 coupled on the exhaust line 132 in proximity to the post-retort subsystem 140. The sensors 152 and 154 may independently include temperature sensors, pressure sensors, flow sensors, or any other sensor that measures operating parameters of the FIC process and/or the FIC system 100. The sensor 152 may monitor operating parameters of the post-retort fluid stream in the exhaust line 132 upstream from the post-retort subsystem 140 and the sensor 154 may monitor operating parameters of the post-retort fluid stream in the exhaust line downstream from the post-retort subsystem 140.

The controller 118 may receive measurements from the sensors 126, 152, and/or 154 and make determinations and/or execute control actions based on the monitored operating parameters of the FIC process and/or the FIC system 100. For example, the controller 118 may receive measurements indicative of operating parameters upstream from the post-retort subsystem 140 (e.g., the temperature within the retort 102, the flow rate of the process gases supplied to the retort 102, the temperature of the post-retort fluid stream upstream from the post-retort subsystem 140, and/or the flow rate of the post-retort fluid stream upstream from the post-retort subsystem 140) and control the cooling device 144 and/or the heating device 150 to respond to one or more of the monitored operating parameters upstream from the post-retort subsystem 140. For example, the controller 118 may increase an amount of cooling fluid supplied to the cooling device 144 and/or an amount of heating fluid supplied to the heating device 150 where more cooling and/or heating is required, and/or decreasing an amount of cooling fluid supplied to the cooling device 144 and/or an amount of heating fluid supplied to the heating device 150 where less cooling and/or heating is required. Additionally and/or alternatively, the controller 118 may receive measurements indicative of operating parameters downstream from the post-retort subsystem 140 (e.g., the temperature of the post-retort fluid stream exiting the separator 142) and control the cooling device 144 and/or the heating device 150 to respond to one or more of the monitored operating parameters downstream from the post-retort subsystem 140. For example, the controller 118 may determine that the temperature of the post-retort fluid stream exiting the separator 142 is too high or too low, compared to an established setpoint or based on in-process determinations, and control the heating device 150 to increase or decrease the re-heating based on the determination.

The controller 118 may implement any suitable control method that enables the controller 118 to function as described herein. For example, the controller 118 may implement a control loop or a combination of control loops to control the cooling device 144 and/or the heating device 150. Exemplary control loops that may be implemented by the controller 118 include open-loop control, closed-loop control, as well as a combination thereof. The term "open-loop control" generally refers to a control loop or control command that does not receive feedback from a measured operating parameter of the FIC system 100. For example, the controller 118 may implement open-loop control by executing control actions based on monitored operating parameters upstream from the post-retort subsystem 140 (e.g., measured by the sensors 126 and 152) without using feedback based on monitored operating parameters downstream from the post-retort subsystem 140 (e.g., measured by the sensor 154). The term "closed-loop control" generally refers to a control loop or control command that utilizes as an input or depends on feedback from, a measured operating parameter of the FIC system 100. Such a measured operating parameter may include a measurement from a sensor (e.g., the sensor 154) configured to measure a system variable that depends on an input by such control loop or control command. The controller 118 that utilizes closed-loop control may compare a measured operating parameter (e.g., a temperature of the post-retort fluid stream exiting the separator 142) to a setpoint (e.g., a setpoint corresponding to the third temperature of the post-retort fluid stream) to determine an error value, which may be used, for example, in a PID control model or any other desired control model. In some embodiments, the controller 118 may implement a learning feedback loop to tune setpoints (e.g., the setpoints corresponding to the second and/or third temperatures) using observed historical process data of the FIC system 100 and learning suitable set points to optimize control of the cooling device 144 and heating device 150 during an FIC process.

Figure 3:
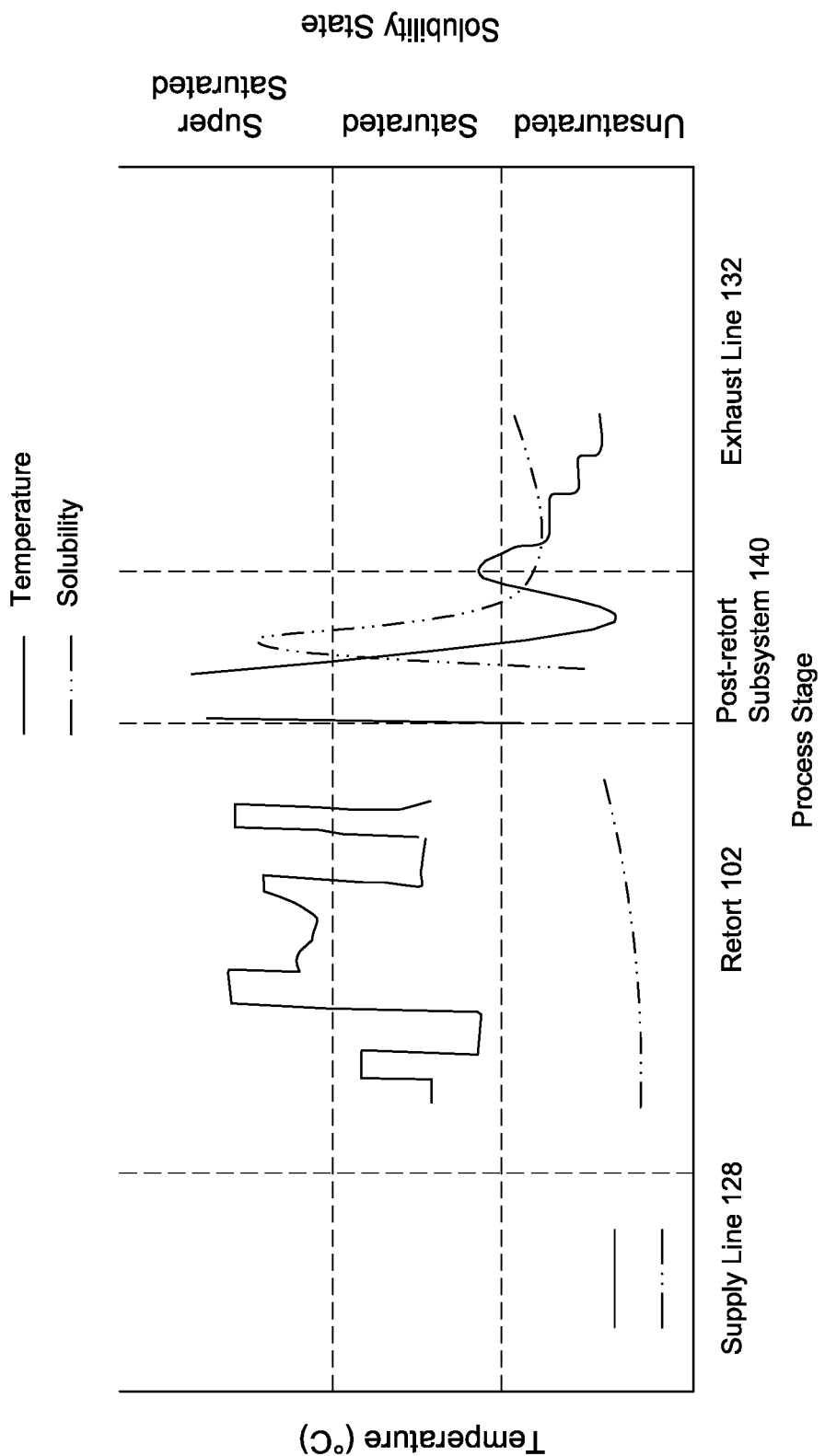
FIG. 3 is a conceptual diagram of thermal and solubility states of process gases within a retort, and a post-retort fluid stream within a retort exhaust line in an exemplary fluoride ion cleaning system that includes a post-retort subsystem.

FIG. 3 illustrates a conceptual diagram of the thermal and solubility states of the process gases in the retort 102 and the post-retort fluid stream through the exhaust line 132 between the retort 102 and the scrubber 134, in the exemplary FIC system 200 that includes the post-retort subsystem 140. As shown in FIG. 3, similar to the diagram shown in FIG. 2, the temperature of the process gases entering the retort 102 through the supply line 128 is relatively low. At this stage, there are no solids dissolved in the process gases as the process gases have not come into contact with the component 106 in the retort 102. In the retort 102, the temperature of the process gases increases rapidly as the interior 104 is at maintained a suitable temperature for the FIC process (e.g., at a temperature of between about 950° C. to about 1100° C.). Also, as shown in FIG. 3, the temperature within the retort 102 varies throughout the FIC process according to the control scheme of the FIC process.

At this stage, the solubility of the process gases increases as the working fluid (e.g., hydrogen fluoride) acts on the component 106, converting metal oxides thereon into metal fluorides which are dissolved within the process gases. Because the process gases are at very high temperatures, the solubility state of the solution remains in an unsaturated state. The post-retort fluid stream may be at a first temperature of between about 700° C. to about 950° C. when exiting the retort 102. After exiting the retort 102, the post-retort fluid stream enters the post-retort subsystem 140 and the post-retort fluid stream is rapidly cooled to the second temperature (e.g., a temperature of between about 50° C. to about 450° C.) via the cooling device 144. The rapid decrease in temperature of the post-retort fluid stream in the post-retort subsystem 140 results in the solution become very saturated and potentially even super saturated, causing the metal fluorides to precipitate out of the post-retort fluid stream within the separator 142. Upon exiting the separator 142, the post-retort fluid stream is reheated the third temperature (e.g., to a temperature within a range of about 50° C. to about 950° C. that is higher than the second temperature and lower than the first temperature) via the heating device 150. At this stage, the post-retort fluid stream flowing through the exhaust line 132 is relatively unsaturated as a substantial fraction of the metal fluorides have precipitated out. Additionally, the post-retort fluid stream may be re-heated to a suitable temperature above the saturation point. As a result, compared to an FIC process diagrammed in FIG. 2, fouling of the downstream equipment (e.g., the exhaust line 132, the control valve 138, and/or the vacuum pump 130) is significantly reduced or eliminated. Thus, the exemplary FIC process diagrammed in FIG. 3, which includes processing the post-retort fluid stream in the post-retort subsystem 140, facilitates increasing the useful lifetime of the downstream equipment, decreasing maintenance and downtime costs associated with cleaning and/or replacing fouled equipment, and enabling lower cost materials to be used to form the equipment.

Referring to FIGS. 4-7, various exemplary embodiments of the post-retort subsystem 140 are shown. Embodiments of the post-retort subsystem 140 are not limited to the exemplary embodiments shown and described. The post-retort subsystem 140 may include any combination of the features included in the exemplary embodiments of the post-retort subsystem 140. The exemplary embodiments of the post-retort subsystem 140 may include any and/or all of the features described above. Any features not specifically described for a specific exemplary embodiment of the post-retort subsystem 140 is not indicative of an absence of such feature. Moreover, the exemplary embodiments of the post-retort subsystem 140 include all the control features facilitated and/or enabled by the controller 118 described above.

Figure 4:
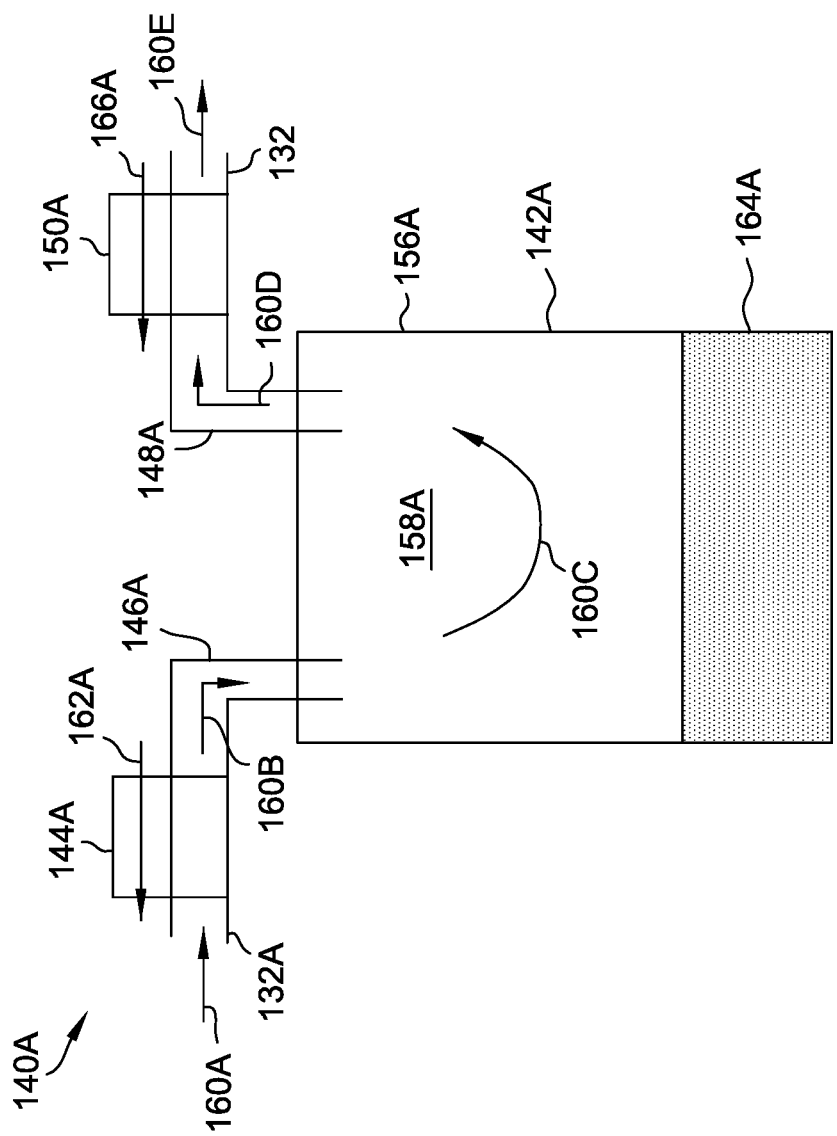
FIG. 4 is a schematic illustration of a first exemplary post-retort subsystem that may be included in the fluoride ion cleaning system shown in FIG. 1.

FIG. 4 shows a first exemplary post-retort subsystem 140A that includes a separator 142A, a cooling device 144A, and a heating device 150A. The separator 142A includes a housing or vessel 156A that defines an inlet 146A and an outlet 148A. The inlet 146A fluidly couples an interior 158A of the vessel 156A with the retort 102 (shown in FIG. 1) via the exhaust line 132 and the outlet 148A fluidly couples the interior 158A with the vacuum pump 130 (shown in FIG. 1). A post-retort fluid stream exiting the retort 102, indicated by the arrow 160A, flows towards the post-retort subsystem 140A. The post-retort fluid stream 160A exiting the retort 102 is at a relatively high first temperature (e.g., a temperature of between about 700° C. to about 950° C.).

The cooling device 144A is coupled about the exhaust line 132 adjacent to the inlet 146A and selectively cools the post-retort fluid stream 160A. The cooling device 144A may additionally and/or alternatively be coupled about the inlet 146A for cooling the post-retort fluid stream 160A. The cooling device 144a includes an inline heat exchanger that transfers heat from the post-retort fluid stream 160A and a cooling fluid 162A (e.g., chilled water). A post-retort fluid stream exiting the cooling device 144A and entering the vessel 156A, indicated by the arrow 160B, has been cooled to a second temperature (e.g., a temperature of between about 50° C. to about 450° C.).

At the second temperature, the post-retort fluid stream flowing through the interior 158A, indicated by the arrow 160C, is at a saturated or super saturated solubility state such that particulate 164A (e.g., metal fluorides) precipitate out of the post-retort fluid stream 160C and deposit and/or accumulate within the interior 158A. The particulate 164A are thereby separated from the post-retort fluid stream 160C such that a saturation level of the post-retort fluid stream exiting the vessel 156A, indicated by the arrow 160D, at the second temperature is lower than the saturation level of the post-retort fluid stream 160B entering the vessel 156A. Separation of the particulate 164A from the post-retort fluid stream 160C may further be facilitated by gravity-driven separation within the interior 158A. In some embodiments, the vessel 156A may facilitate velocity-driven separation within the interior 158a. For example, the vessel 156A may be a cyclone separator.

The post-retort fluid stream 160D exiting the vessel 156A at the second temperature enters the heating device 150A that heats the post-retort fluid stream 160D. The heating device 150A is coupled about the exhaust line 132 adjacent to the outlet 148A. The heating device 150A may additionally and/or alternatively be coupled about the outlet 148A for heating the post-retort fluid stream 160D. The heating device 150A includes an inline heat exchanger that transfers heat from a heating fluid 166A (e.g., hot water) to the post-retort fluid stream 160D. A post-retort fluid stream exiting the heating device 150A, indicated by the arrow 160E, has been re-heated to a third temperature (e.g., a temperature within a range of about 50° C. to about 950° C. that is higher than the second temperature and lower than the first temperature). The post-retort fluid stream 160E is channeled to downstream equipment (e.g., the vacuum pump 130 and the scrubber 134 shown in FIG. 1) for removing excess working fluid (e.g., hydrogen fluoride) and other reaction byproducts from the post-retort fluid stream 160E.

Figure 5:
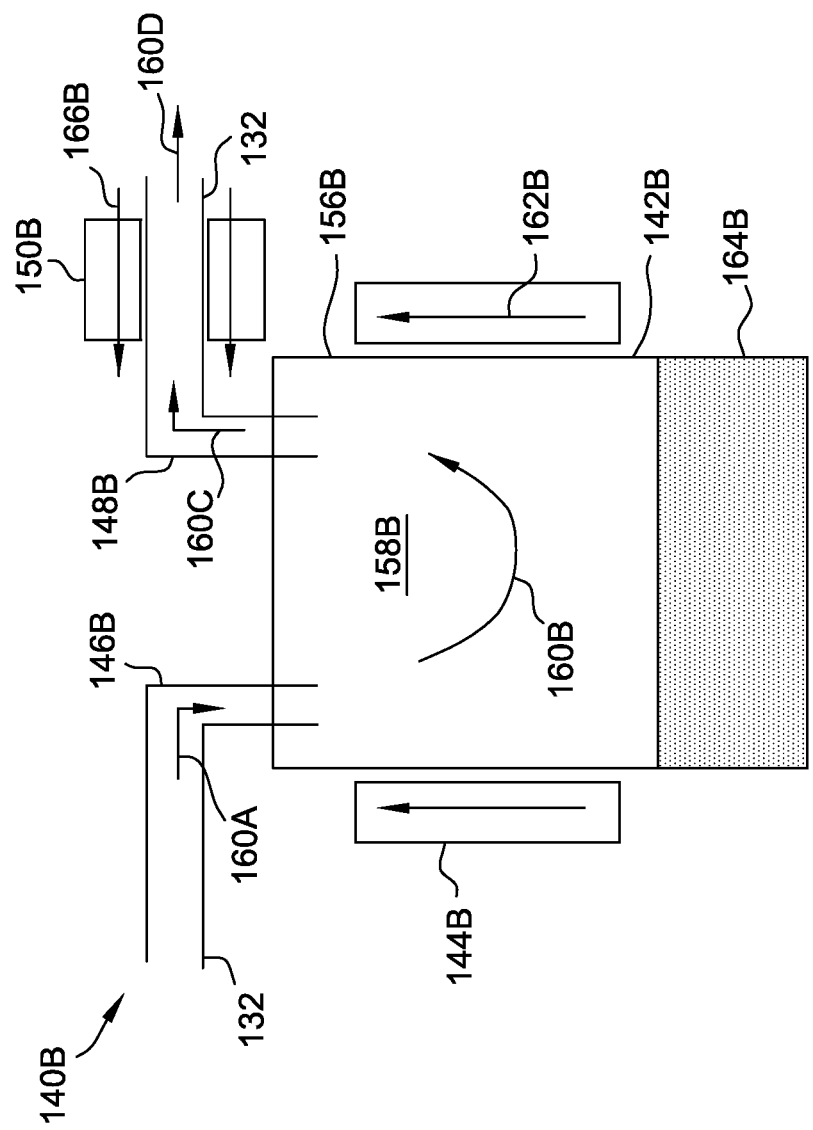
FIG. 5 is a schematic illustration of a second exemplary post-retort subsystem that may be included in the fluoride ion cleaning system shown in FIG. 1.

FIG. 5 shows a second exemplary post-retort subsystem 140B that includes a separator 142B, a cooling device 144B, and a heating device 150B. The separator 142B includes a housing or vessel 156B that defines an inlet 146B and an outlet 148B. The inlet 146B fluidly couples an interior 158B of the vessel 156B with the retort 102 (shown in FIG. 1) via the exhaust line 132 and the outlet 148B fluidly couples the interior 158B with the vacuum pump 130 (shown in FIG. 1). A post-retort fluid stream exiting the retort 102, indicated by the arrow 160A, flows towards the post-retort subsystem 140B and enters into the interior 158B at a relatively high first temperature (e.g., a temperature of between about 700° C. to about 950° C.).

The cooling device 144B circumscribes the vessel 156B and cools the interior 158B and, thereby, cools a post-retort fluid stream within the interior 158B, indicated by the arrow 160B. The cooling device 144B may include a cooling jacket and/or cooling coils that circumscribe the vessel 156B. A cooling fluid 162B (e.g., chilled water) circulates through the cooling device 144B to facilitate cooling the interior 158B. The post-retort fluid stream 160B is cooled within the interior 158B to a second temperature (e.g., a temperature of between about 50° C. to about 450° C.).

At the second temperature, the post-retort fluid stream 160B flowing through the interior 158B is at a saturated or super saturated solubility state such that particulate 164B (e.g., metal fluorides) precipitate out of the post-retort fluid stream 160B and deposit and/or accumulate within the interior 158B. The particulate 164B are thereby separated from the post-retort fluid stream 160B such that a saturation level of the post-retort fluid stream exiting the vessel 156B, indicated by the arrow 160C, at the second temperature is lower than the saturation level of the post-retort fluid stream 160A entering the vessel 156B. Separation of the particulate 164B from the post-retort fluid stream 160B may further be facilitated by gravity-driven separation within the interior 158B. In some embodiments, the vessel 156B may facilitate velocity-driven separation within the interior 158B. For example, the vessel 156B may be a cyclone separator.

The post-retort fluid stream 160C exiting the vessel 156B at the second temperature enters the heating device 150B that heats the post-retort fluid stream 160C. The heating device 150B is coupled about the exhaust line 132 adjacent to the outlet 148B. The heating device 150B may additionally and/or alternatively be coupled about the outlet 148B for heating the post-retort fluid stream 160C. The heating device 150B includes a heating jacket or heating coils that circumscribe the exhaust line 132 adjacent to the outlet 148B and/or that circumscribe the outlet 148B. A heating fluid 166B (e.g., hot water) circulates through the heating device 150B and heat is transferred from the heating fluid 166B to the post-retort fluid stream 160C. A post-retort fluid stream exiting the heating device 150B, indicated by the arrow 160D, has been re-heated to a third temperature (e.g., a temperature within a range of about 50° C. to about 950° C. that is higher than the second temperature and lower than the first temperature). The post-retort fluid stream 160D is channeled to downstream equipment (e.g., the vacuum pump 130 and the scrubber 134 shown in FIG. 1) for removing excess working fluid (e.g., hydrogen fluoride) and other reaction byproducts from the post-retort fluid stream 160D.

Figure 6:
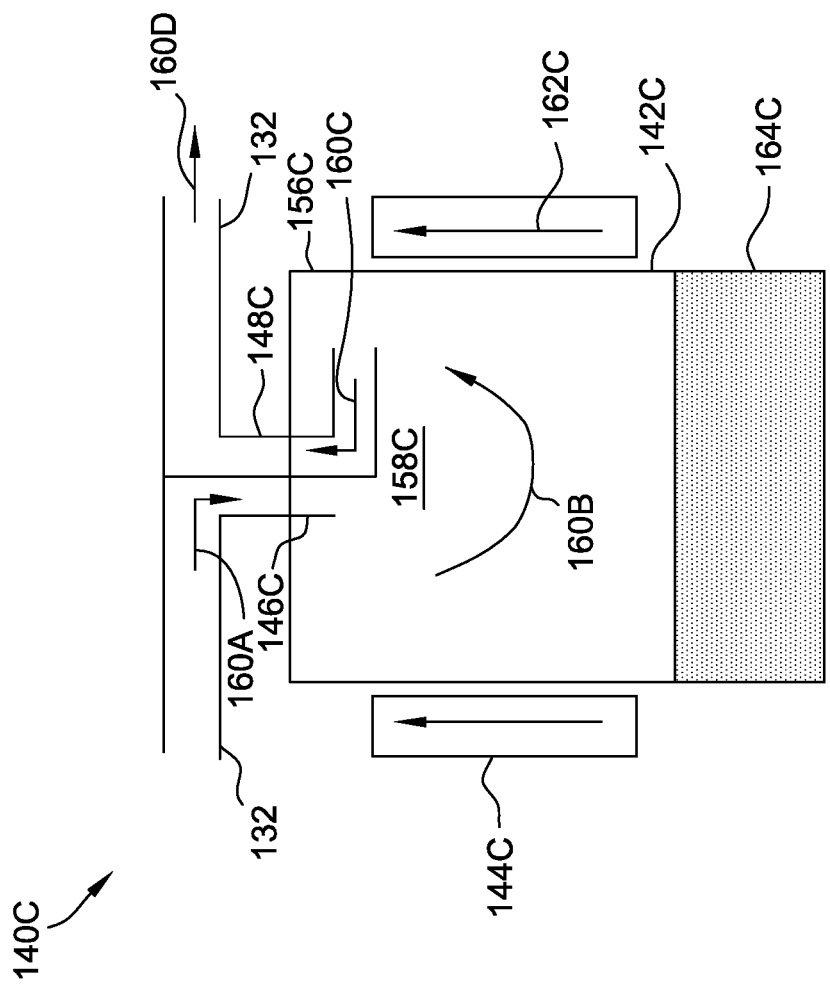
FIG. 6 is a schematic illustration of a third exemplary post-retort subsystem that may be included in the fluoride ion cleaning system shown in FIG. 1.

FIG. 6 shows a third exemplary post-retort subsystem 140C that includes a separator 142C and a cooling device 144C. The separator 142c includes a housing or vessel 156C that defines an inlet 146C and an outlet 148C. The inlet 146C fluidly couples an interior 158C of the vessel 156C with the retort 102 (shown in FIG. 1) via the exhaust line 132 and the outlet 148C fluidly couples the interior 158C with the vacuum pump 130 (shown in FIG. 1). A post-retort fluid stream exiting the retort 102, indicated by the arrow 160A, flows towards the post-retort subsystem 140c and enters into the interior 158c at a relatively high first temperature (e.g., a temperature of between about 700° C. to about 950° C.).

The cooling device 144C circumscribes the vessel 156C and cools the interior 158C and, thereby, cools a post-retort fluid stream within the interior 158C, indicated by the arrow 160B. The cooling device 144C may include a cooling jacket and/or cooling coils that circumscribe the vessel 156C. A cooling fluid 162C (e.g., chilled water) circulates through the cooling device 144C to facilitate cooling the interior 158C. The post-retort fluid stream 160B is cooled within the interior 158C to a second temperature (e.g., a temperature of between about 50° C. to about 450° C.).

At the second temperature, the post-retort fluid stream 160B flowing through the interior 158C is at a saturated or super saturated solubility state such that particulate 164C (e.g., metal fluorides) precipitate out of the post-retort fluid stream 160B and deposit and/or accumulate within the interior 158C. The particulate 164C are thereby separated from the post-retort fluid stream 160C such that a saturation level of the post-retort fluid stream exiting the vessel 156C, indicated by the arrow 160C, at the second temperature is lower than the saturation level of the post-retort fluid stream 160A entering the vessel 156C. Separation of the particulate 164C from the post-retort fluid stream 160B may further be facilitated by gravity-driven separation within the interior 158C. In some embodiments, the vessel 156C may facilitate velocity-driven separation within the interior 158C. For example, the vessel 156C may be a cyclone separator.

The post-retort fluid stream 160C exits the vessel 156C at the second temperature via the outlet 148C. As shown in FIG. 6, the piping defining the outlet 148C is thermally coupled with the piping defining the inlet 146C. This configuration facilitates heat transfer between the post-retort fluid stream 160A entering the vessel 156C at the first temperature and the post-retort fluid stream 160C exiting the vessel 156C at the second temperature. In particular, heat may be transferred from the post-retort fluid stream 160A to the post-retort fluid stream 160C such that the post-retort fluid stream 160A is cooled and the post-retort fluid stream 160C is heated. The heat transfer between the post-retort fluid stream 160A and the post-retort fluid stream 160C may be sufficient to produce a re-heated post-retort fluid stream 160D entering the downstream exhaust line 132 at a third temperature (e.g., a temperature within a range of about 50° C. to about 950° C. that is higher than the second temperature and lower than the first temperature). In the embodiment shown, the heat transfer between the post-retort fluid stream 160A and the post-retort fluid stream 160C negates the need for a heating device in the post-retort subsystem 140C. In other embodiments, the post-retort subsystem may also include a heating device that heats the post-retort fluid stream 160C exiting the outlet 148C. The heating device may be upstream from and/or downstream from the thermal coupling between the inlet 146C and the outlet 148C. The heating device may include, for example, an inline heat exchanger, and/or a heating jacket or heating coils that circumscribe the exhaust line 132 adjacent to the outlet 148c and/or that circumscribe the outlet 148C. A heating fluid (e.g., hot water) may be circulated through the heating device and heat may be transferred from the heating fluid to the post-retort fluid stream 160C before, after, and/or during the heat transfer between the post-retort fluid stream 160C and the post-retort fluid stream 160A. A post-retort fluid stream exiting the outlet 148C and, optionally, a heating device, indicated by the arrow 160D, has been re-heated to a third temperature (e.g., a temperature within a range of about 50° C. to about 950° C. that is higher than the second temperature and lower than the first temperature). The post-retort fluid stream 160D is channeled to downstream equipment (e.g., the vacuum pump 130 and the scrubber 134 shown in FIG. 1) for removing excess working fluid (e.g., hydrogen fluoride) and other reaction byproducts from the post-retort fluid stream 160D.

Figure 7:
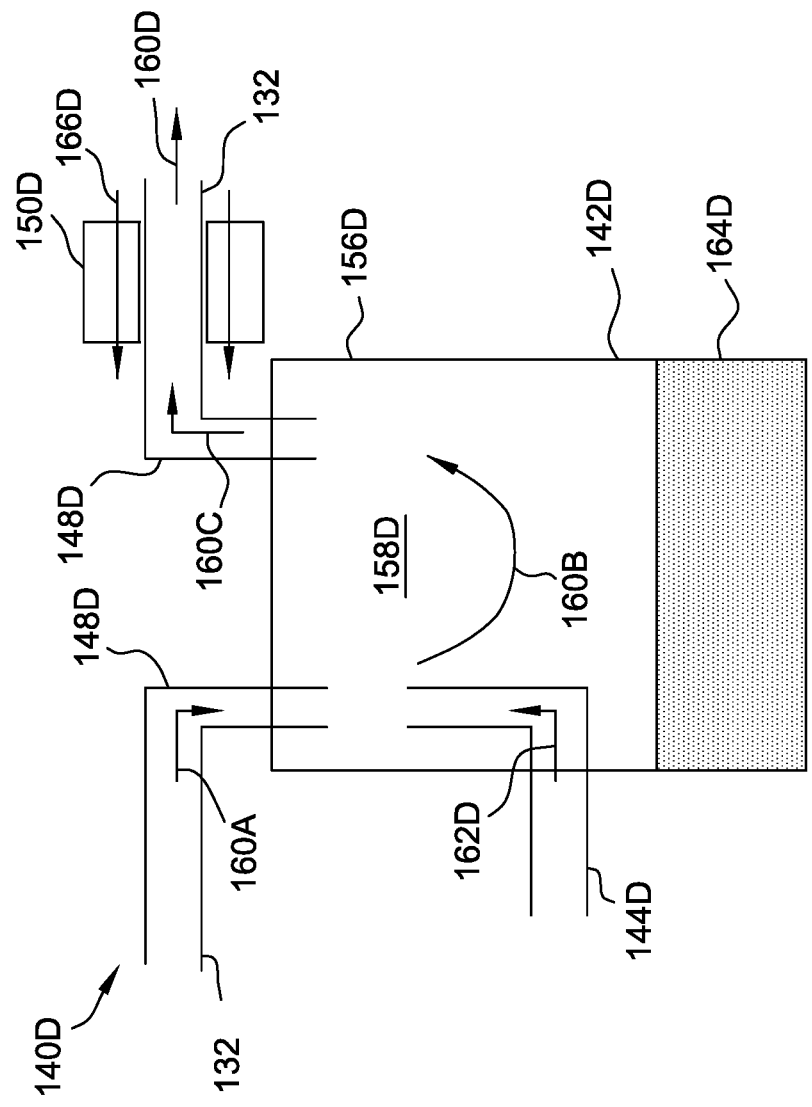
FIG. 7 is a schematic illustration of a fourth exemplary post-retort subsystem that may be included in the fluoride ion cleaning system shown in FIG. 1.

FIG. 7 shows a fourth exemplary post-retort subsystem 140D that includes a separator 142D, a cooling device 144D, and a heating device 150D. The separator 142D includes a housing or vessel 156D that defines an inlet 146D and an outlet 148D. The inlet 146D fluidly couples an interior 158D of the vessel 156D with the retort 102 (shown in FIG. 1) via the exhaust line 132 and the outlet 148D fluidly couples the interior 158D with the vacuum pump 130 (shown in FIG. 1). A post-retort fluid stream exiting the retort 102, indicated by the arrow 160A, flows towards the post-retort subsystem 140D and enters into the interior 158D at a relatively high first temperature (e.g., a temperature of between about 700° C. to about 950° C.).

The cooling device 144D is a cooling fluid injection device for injecting a cooling fluid 162D into the vessel 156D to facilitate cooling the post-retort fluid stream 160A. The cooling fluid 162D may suitably include process gases and/or reaction byproducts that are contained in the post-retort fluid stream 106A such as, for example, the working fluid (e.g., hydrogen fluoride), the carrier gas (e.g., $H_2$), and/or water vapor. For example, a flow of carrier gas (e.g., $H_2$) may be channeled from the source 114 to the cooling device 144D for injection into the vessel 156D as the cooling fluid 162D. Suitably, where the cooling fluid 162D is a process gas, the cooling fluid 162D that is channeled to the cooling device 144D bypasses the retort 102. The cooling fluid 162D is injected into the vessel 156D and contacts the post-retort fluid stream 106A to cool the post-retort fluid stream flowing in the interior 158D, indicated by the arrow 160B, to a second temperature (e.g., a temperature of between about 50° C. to about 450° C.).

At the second temperature, the post-retort fluid stream 160B flowing through the interior 158B is at a saturated or super saturated solubility state such that particulate 164D (e.g., metal fluorides) precipitate out of the post-retort fluid stream 160B and deposit and/or accumulate within the interior 158D. The particulate 164D are thereby separated from the post-retort fluid stream 160B such that a saturation level of the post-retort fluid stream exiting the vessel 156D, indicated by the arrow 160C, at the second temperature is lower than the saturation level of the post-retort fluid stream 160A entering the vessel 156D. Separation of the particulate 164D from the post-retort fluid stream 160B may further be facilitated by gravity-driven separation within the interior 158D. In some embodiments, the vessel 156D may facilitate velocity-driven separation within the interior 158D. For example, the vessel 156D may be a cyclone separator.

The post-retort fluid stream 160C exiting the vessel 156D at the second temperature enters the heating device 150D that heats the post-retort fluid stream 160C. The heating device 150D is coupled about the exhaust line 132 adjacent to the outlet 148D. The heating device 150D may additionally and/or alternatively be coupled about the outlet 148D for heating the post-retort fluid stream 160C. The heating device 150D includes a heating jacket or heating coils that circumscribe the exhaust line 132 adjacent to the outlet 148D and/or that circumscribe the outlet 148D. A heating fluid 166D (e.g., hot water) circulates through the heating device 150D and heat is transferred from the heating fluid 166D to the post-retort fluid stream 160C. A post-retort fluid stream exiting the heating device 150D, indicated by the arrow 160D, has been re-heated to a third temperature (e.g., a temperature within a range of about 50° C. to about 950° C. that is higher than the second temperature and lower than the first temperature). The post-retort fluid stream 160D is channeled to downstream equipment (e.g., the vacuum pump 130 and the scrubber 134 shown in FIG. 1) for removing excess working fluid (e.g., hydrogen fluoride) and other reaction byproducts from the post-retort fluid stream 160D. The cooling fluid 162D injected via the cooling device 144D may provide an additional advantage of further diluting particulate that remain dissolved within the post-retort fluid stream 160D after the separation process at the post-retort subsystem 140D.

The embodiments described herein relate to fluoride ion cleaning systems and methods that include processing of a post-retort fluid stream by separating particulate from the post-retort fluid stream. The above-described embodiments facilitate reducing or eliminating fouling in downstream handling equipment (e.g., piping, sensors, pumps, valves, scrubbers), increasing the operational lifetime of the equipment, reducing maintenance and downtime costs associated with cleaning and/or replacing fouled equipment, and enhancing greater flexibility in the materials that may be used in fabricating the equipment used in handling of post-retort fluid streams in fluoride ion cleaning processes. The above-described embodiments include a post-retort subsystem that cools the post-retort fluid stream to a temperature at which a suitable fraction of particulate dissolved in the post-retort fluid stream precipitate out of solution, and that may suitably re-heat the post-retort fluid stream after separation to a suitable temperature prior to it entering a downstream vacuum pump and/or scrubber. The post-retort subsystem may additionally and/or alternatively re-heat the post-retort fluid stream after separation to facilitate reducing or eliminating the propensity of any particulate that remain dissolved in the post-retort fluid stream after separation to deposit on the downstream equipment. Moreover, the exemplary embodiments may include a controller that enables greater flexibility in the control of cooling and/or re-heating the post-retort fluid stream using the post-retort subsystem. For example, the controller may control cooling and/or heating the post-retort fluid stream by controlling the cooling and/or heating of the post-retort fluid stream by the post-retort subsystem to respond to one or more planned or dynamic operating parameters of the fluoride ion cleaning process and/or system. As such, the cooling and/or heating of the post-retort subsystem may be fine-tuned to the operational requirements of the post-retort fluid stream based on the current conditions of the fluoride ion cleaning process and/or system.

The above description is meant to be exemplary only, and one skilled in the art will recognize that changes may be made to the embodiments described without departing from the scope of the invention disclosed. Modifications, which fall within the scope of the present invention, will be apparent to those skilled in the art, in light of a review of this disclosure, and such modifications are intended to fall within the appended claims.

Further aspects of the present disclosure are provided by the subject matter of the following clauses:

Clause 1. A fluoride ion cleaning system comprising: a retort for cleaning at least one component via a working fluid supplied to the retort; a post-retort subsystem for processing a post-retort fluid stream exiting the retort at a first temperature, the post-retort subsystem comprising: a separator in flow communication with the retort, the separator comprising an inlet for receiving the post-retort fluid stream from the retort and an outlet for the post-retort fluid stream exiting the separator; and a cooling device for selectively cooling the post-retort fluid stream to a second temperature, the second temperature being lower than the first temperature, wherein the second temperature enables particulate to be separated from the post-retort fluid stream within the separator; and a scrubber downstream from the post-retort subsystem for receiving the post-retort fluid stream discharged from the separator.

Clause 2. The fluoride ion cleaning system of Clause 1, wherein the cooling device of the post-retort subsystem comprises at least one of cooling coils and a cooling jacket circumscribing the separator to facilitate cooling the post-retort fluid stream to the second temperature.

Clause 3. The fluoride ion cleaning system of any preceding clause, wherein the cooling device of the post-retort subsystem comprises a cooling fluid injection device for injecting cooling fluid into the separator to facilitate cooling the post-retort fluid stream to the second temperature.

Clause 4. The fluoride ion cleaning system of Clause 3, wherein the cooling fluid comprises hydrogen fluoride (HF), argon (Ar), hydrogen ($H_2$), or nitrogen ($N_2$).

Clause 5. The fluoride ion cleaning system of any preceding clause, wherein the separator comprises a cyclone separator that facilitates separating the particulate from the post-retort fluid stream at the second temperature via velocity-driven separation.

Clause 6. The fluoride ion cleaning system of any one of Clauses 1-4, wherein the separator comprises a gravity separator that facilitates separating the particulate from the post-retort fluid stream at the second temperature via gravity-driven separation.

Clause 7. The fluoride ion cleaning system of any preceding clause, wherein the inlet and the outlet of the separator are thermally coupled to facilitate heat transfer between the post-retort fluid stream entering the separator and the post-retort fluid stream exiting the separator.

Clause 8. The fluoride ion cleaning system of any preceding clause, wherein the post-retort subsystem further comprises a heating device for selectively heating the post-retort fluid stream exiting the separator to a third temperature that is higher than the second temperature.

Clause 9. The fluoride ion cleaning system of Clause 8, wherein the heating device of the post-retort subsystem comprises at least one of heating coils and a heating jacket coupled about the outlet of the separator to facilitate heating the post-retort fluid stream exiting the separator to the third temperature.

Clause 10. The fluoride ion cleaning system of any preceding clause, wherein the post-retort subsystem is downstream from the retort for processing a first portion of the post-retort fluid stream, the fluoride ion cleaning system further comprising a by-pass channel that selectively channels a second portion of the post-retort fluid stream to bypass the post-retort subsystem.

Clause 11. A fluoride ion cleaning system comprising a retort for cleaning at least one component via a working fluid supplied to the retort, and a post-retort subsystem for processing a post-retort fluid stream exiting the retort at a first temperature, the post-retort subsystem comprising: a separator in flow communication with the retort, the separator comprising an inlet for receiving the post-retort fluid stream from the retort and an outlet for the post-retort fluid stream exiting the separator; and a cooling device for selectively cooling the post-retort fluid stream to a second temperature, the second temperature being lower than the first temperature, wherein the second temperature enables particulate to be separated from the post-retort fluid stream within the separator; wherein the fluoride ion cleaning system further comprises a controller coupled in communication with the cooling device, wherein the controller is configured to control the cooling device based on a first setpoint corresponding to the second temperature and at least one operating parameter of the fluoride ion cleaning system.

Clause 12. The fluoride ion cleaning system of Clause 11, wherein the at least one operating parameter comprises a condition of the post-retort fluid stream upstream from the post-retort subsystem.

Clause 13. The fluoride ion cleaning system of Clause 11 or Clause 12, wherein the at least one operating parameter comprises a control scheme of the fluoride ion cleaning system.

Clause 14. The fluoride ion cleaning system of any one of Clauses 11-13, wherein the post-retort subsystem further comprises a heating device for selectively heating the post-retort fluid stream exiting the separator to a third temperature that is higher than the second temperature, and wherein the controller is coupled in communication with the heating device and is configured to control the heating device based on a second setpoint corresponding to the third temperature.

Clause 15. The fluoride ion cleaning system of Clause 14, wherein the controller is further configured to control the heating device based on a measured temperature of the post-retort fluid stream upstream from the post-retort subsystem.

Clause 16. The fluoride ion cleaning system of Clause 14 or Clause 15, wherein the controller is further configured to control the heating device based on the at least one operating parameter of the fluoride ion cleaning system.

Clause 17. A method of operating a fluoride ion cleaning system, the method comprising: supplying a working fluid to a retort for cleaning at least one component; channeling a post-retort fluid stream from the retort to a separator, wherein the post-retort fluid stream exits the retort at a first temperature; cooling the post-retort fluid stream to a second temperature that is lower than the first temperature; separating particulate from the post-retort fluid stream at the second temperature within the separator; and channeling the post-retort fluid stream from the separator towards a scrubber.

Clause 18. The method of Clause 17, further comprising controlling the cooling the post-retort fluid stream to the second temperature based on at least one operating parameter of the fluoride ion cleaning system.

Clause 19. The method of Clause 17 or Clause 18, further comprising heating the post-retort fluid stream being channeled from the separator to a third temperature that is higher than the second temperature.

Clause 20. The method of Clause 19, further comprising controlling the heating the post-retort fluid stream to the third temperature based on at least one operating parameter of the fluoride ion cleaning system.

Exemplary embodiments of fluoride ion cleaning systems are described above in detail. The systems and methods described herein are not limited to the specific embodiments described herein, but rather, steps of the methods may be utilized independently and separately from other steps described herein. For example, the methods described herein are not limited to practice with the cleaning of gas turbine engine components as described herein. Rather, the exemplary embodiment can be implemented and utilized in connection with any application where processing of post-retort fluid streams produced in a fluoride ion cleaning process is desired.

Although specific features of various embodiments of the disclosure may be shown in some drawings and not in others, this is for convenience only. In accordance with the principles of the disclosure, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A fluoride ion cleaning system comprising:
   a retort for cleaning at least one component via a working fluid supplied to the retort;
   a post-retort subsystem for processing a post-retort fluid stream exiting the retort at a first temperature, the post-retort subsystem comprising:
      a separator in flow communication with the retort, the separator comprising an inlet for receiving the post-retort fluid stream from the retort and an outlet for the post-retort fluid stream exiting the separator; and
      a cooling device for selectively cooling the post-retort fluid stream to a second temperature, the second temperature being lower than the first temperature, wherein the second temperature enables particulate to be separated from the post-retort fluid stream within the separator; and
   a scrubber downstream from the post-retort subsystem for receiving the post-retort fluid stream discharged from the separator,
   wherein the separator of the post-retort subsystem includes an interior that is free of any filtration media including liquid-based filtration media and is configured to receive the separated particulate.

2. The fluoride ion cleaning system of claim 1, wherein the cooling device of the post-retort subsystem comprises at least one of cooling coils and a cooling jacket circumscribing the separator to facilitate cooling the post-retort fluid stream to the second temperature.

3. The fluoride ion cleaning system of claim 1, wherein the cooling device of the post-retort subsystem comprises a cooling fluid injection device for injecting cooling fluid into the separator to facilitate cooling the post-retort fluid stream to the second temperature.

4. The fluoride ion cleaning system of claim 3, wherein the cooling fluid comprises hydrogen fluoride (HF), argon (Ar), hydrogen ($H_2$), or nitrogen ($N_2$).

5. The fluoride ion cleaning system of claim 1, wherein the separator comprises a cyclone separator that facilitates separating the particulate from the post-retort fluid stream at the second temperature via velocity-driven separation.

6. The fluoride ion cleaning system of claim 1, wherein the separator comprises a gravity separator that facilitates separating the particulate from the post-retort fluid stream at the second temperature via gravity-driven separation.

7. The fluoride ion cleaning system of claim 1, wherein the inlet and the outlet of the separator are thermally coupled to facilitate heat transfer between the post-retort fluid stream entering the separator and the post-retort fluid stream exiting the separator.

8. The fluoride ion cleaning system of claim 1, wherein the post-retort subsystem further comprises a heating device for selectively heating the post-retort fluid stream exiting the separator to a third temperature that is higher than the second temperature.

9. The fluoride ion cleaning system of claim 8, wherein the heating device of the post-retort subsystem comprises at least one of heating coils and a heating jacket coupled about the outlet of the separator to facilitate heating the post-retort fluid stream exiting the separator to the third temperature.

10. The fluoride ion cleaning system of claim 1, wherein the post-retort subsystem is downstream from the retort for processing a first portion of the post-retort fluid stream, the fluoride ion cleaning system further comprising a by-pass channel that selectively channels a second portion of the post-retort fluid stream to bypass the post-retort subsystem.

11. A fluoride ion cleaning system comprising a retort for cleaning at least one component via a working fluid supplied to the retort, and a post-retort subsystem for processing a post-retort fluid stream exiting the retort at a first temperature, the post-retort subsystem comprising:
   a separator in flow communication with the retort, the separator comprising an inlet for receiving the post-retort fluid stream from the retort and an outlet for the post-retort fluid stream exiting the separator; and
   a cooling device for selectively cooling the post-retort fluid stream to a second temperature, the second temperature being lower than the first temperature, wherein the second temperature enables particulate to be separated from the post-retort fluid stream within the separator;
   wherein the fluoride ion cleaning system further comprises a controller coupled in communication with the cooling device, wherein the controller is configured to selectively adjust operations of the cooling device to change the working fluid to the second temperature based on a first setpoint corresponding to the second temperature and at least one operating parameter of the fluoride ion cleaning system, and
   wherein the separator of the post-retort subsystem includes an interior that is free of any filtration media including liquid-based filtration media and is configured to receive the separated particulate.

12. The fluoride ion cleaning system of claim 11, wherein the at least one operating parameter comprises a condition of the post-retort fluid stream upstream from the post-retort subsystem.

13. The fluoride ion cleaning system of claim 11, wherein the at least one operating parameter comprises a control scheme of the fluoride ion cleaning system.

14. The fluoride ion cleaning system of claim 11, wherein the post-retort subsystem further comprises a heating device for selectively heating the post-retort fluid stream exiting the separator to a third temperature that is higher than the second temperature, and wherein the controller is coupled in communication with the heating device and is configured to control the heating device based on a second setpoint corresponding to the third temperature.

15. The fluoride ion cleaning system of claim 14, wherein the controller is further configured to control the heating device based on a measured temperature of the post-retort fluid stream upstream from the post-retort subsystem.

16. The fluoride ion cleaning system of claim 14, wherein the controller is further configured to control the heating device based on the at least one operating parameter of the fluoride ion cleaning system.

* * * * *